US012495908B2

(12) United States Patent
Mace

(10) Patent No.: US 12,495,908 B2
(45) Date of Patent: *Dec. 16, 2025

(54) FACE HAMMOCK

(71) Applicant: Anna Mace, Johnstown, CO (US)

(72) Inventor: Anna Mace, Johnstown, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,497

(22) Filed: Aug. 24, 2023

(65) Prior Publication Data

US 2024/0049887 A1  Feb. 15, 2024

Related U.S. Application Data

(63) Continuation of application No. 17/359,230, filed on Jun. 25, 2021, now Pat. No. 11,759,022.

(60) Provisional application No. 63/048,950, filed on Jul. 7, 2020.

(51) Int. Cl.
| | |
|---|---|
| *A47C 20/02* | (2006.01) |
| *A47C 7/38* | (2006.01) |
| *A47G 9/10* | (2006.01) |
| *A61G 13/12* | (2006.01) |

(52) U.S. Cl.
CPC .............. *A47C 20/026* (2013.01); *A47C 7/38* (2013.01); *A47G 9/1009* (2013.01); *A47G 9/1054* (2013.01); *A61G 13/121* (2013.01); *A47C 20/02* (2013.01); *A47G 9/10* (2013.01); *A61G 13/12* (2013.01)

(58) Field of Classification Search
CPC ......... A47C 20/026; A47C 20/02; A47C 7/38; A47C 7/383; A61G 13/121; A61G 13/1205; A61G 13/12; A47G 9/1054; A47G 9/1009; A47G 9/10

USPC ............ 5/613, 621, 622, 636–638, 640, 643
See application file for complete search history.

(56) References Cited

U.S. PATENT DOCUMENTS

| | | | |
|---|---|---|---|
| 2,551,727 | A | 5/1951 | Costello |
| 2,581,802 | A | 1/1952 | Lyons |
| 3,114,527 | A | 12/1963 | Demarest |
| 3,403,413 | A | 10/1968 | Calhoun et al. |
| 3,913,155 | A | 10/1975 | Eary, Sr. |
| 4,823,776 | A | 4/1989 | Foster et al. |
| 5,033,138 | A | 7/1991 | Hong |
| 5,121,969 | A | 6/1992 | Schroeder |
| 5,337,429 | A | 8/1994 | Tucker |

(Continued)

FOREIGN PATENT DOCUMENTS

| | | | | |
|---|---|---|---|---|
| WO | WO 2016026278 | A1 | 2/2016 | |
| WO | WO-2022010990 | A1 * | 1/2022 | ............ A47C 17/84 |

OTHER PUBLICATIONS

Canadian Patent Application No. 3,164,243, Office Action dated Oct. 13, 2023, 9 pages.

(Continued)

*Primary Examiner* — Robert G Santos
(74) *Attorney, Agent, or Firm* — Craig R. Miles; CR MILES P.C.

(57) ABSTRACT

Generally, a face hammock, and a method of making and using a face hammock to support the head of an individual. Embodiments can include a first support member disposed in opposed spaced apart relation to a second support member and one or more flexible members connected by the respective flexible member ends to the first support member and the second support member can be positioned to supportingly engage the head of an individual.

15 Claims, 14 Drawing Sheets

(56) References Cited

U.S. PATENT DOCUMENTS

| | | | |
|---|---|---|---|
| 5,337,760 A | 8/1994 | Nichols | |
| 5,520,623 A | 5/1996 | Williams | |
| 6,581,226 B1 | 6/2003 | Brustein | |
| 7,089,613 B2 | 8/2006 | Cohen | |
| 7,424,759 B2 | 9/2008 | Damron | |
| 7,640,609 B2 | 1/2010 | Roleder et al. | |
| 7,676,867 B2 | 3/2010 | De Laura | |
| 9,398,992 B1 | 7/2016 | Jansen | |
| 10,327,972 B2 | 6/2019 | Cella | |
| 10,646,060 B2 | 5/2020 | Du | |
| 11,759,022 B2 | 9/2023 | Mace | |
| 11,877,661 B2 * | 1/2024 | Tejeda | A47C 16/00 |
| 2005/0109346 A1 * | 5/2005 | Cohen | A61G 13/12 |
| | | | 128/845 |
| 2008/0271248 A1 | 11/2008 | DeLaura | |
| 2016/0120725 A1 | 5/2016 | Slattery et al. | |
| 2017/0273481 A1 | 9/2017 | Du | |
| 2017/0360203 A1 | 12/2017 | Faust | |
| 2022/0007845 A1 * | 1/2022 | Mace | A61G 13/121 |
| 2022/0192386 A1 * | 6/2022 | Tejeda | A47C 16/00 |
| 2024/0049887 A1 * | 2/2024 | Mace | A47G 9/1009 |
| 2024/0156273 A1 * | 5/2024 | Tejeda | A47C 16/00 |

OTHER PUBLICATIONS

Massage Tables Now. Custom Craftworks Massage Table Face Cradle Base & Pillow, 9" Deluxe. Website, https://massagetablesnow.com, originally downloaded Jul. 26, 2021, 5 pages.

PCT International Patent Application No. PCT/US21/40651, International Search Report and Written Opinion of the International Searching Authority dated Oct. 27, 2021, 12 pages.

U.S. Appl. No. 63/048,950, filed Jul. 7, 2020.

U.S. Appl. No. 17/359,230, Office Action mailed Sep. 23, 2022.

U.S. Appl. No. 17/359,230, Office Action mailed Mar. 29, 2023.

* cited by examiner

FACE HAMMOCK

This United States Patent Application is a continuation of U.S. patent application Ser. No. 17/359,230, filed Jun. 25, 2021, now U.S. Pat. No. 11,759,022, issued Sep. 19, 2023, which claims the benefit of U.S. Provisional Patent Application No. 63/048,950, filed Jul. 7, 2020, each hereby incorporated by reference herein.

FIELD OF THE INVENTION

Generally, a face hammock, and a method of making and using a face hammock to support the head of an individual. Embodiments can include a first support member disposed in opposed spaced apart relation to a second support member and one or more flexible members connected by the respective flexible member ends to the first support member and the second support member can be positioned to supportingly engage the head of an individual.

SUMMARY OF THE INVENTION

A broad object of particular embodiments of the invention can be to provide an apparatus including a first support member and a second support member, each having a support member length disposed between a support member first end and a support member second end, said first support member disposed in opposed spaced apart relation to said second support member with one or more flexible members connected to said first support member and connected to said second support member, wherein the opposed spaced apart relation of said first and second support members and connection of the flexible member first end and the flexible member second end along the support member length of the first support member and the second support member affording a configuration to supportingly engage an individual's head.

Another broad object of particular embodiments of the invention be to provide a method of making an apparatus including disposing a first support member in opposed spaced apart relation to a second support member and connecting one or more flexible members by flexible member first ends to the first support member and connecting flexible member second ends to the second support member, and configuring the opposed spaced apart relation of said first and second support members and connection of said flexible member first end and the flexible member second end along said support member length of the first support member and the second support member to supportingly engage an individual's head.

Another broad object of particular embodiments of the invention can be to provide a method of using an apparatus including disposing a first support member in opposed spaced apart relation to a second support member and connecting one or more flexible members by flexible member first ends to the first support member and connecting flexible member second ends to the second support member, and configuring the opposed spaced apart relation of said first and second support members and connection of said flexible member first end and the flexible member second end along said support member length of the first support member and said second support member and supportingly engaging an individual's head to the flexible members.

Naturally, further objects of the invention are disclosed throughout other areas of the specification, drawings, photographs, and claims.

DETAILED DESCRIPTION OF THE INVENTION

Figure 1A:
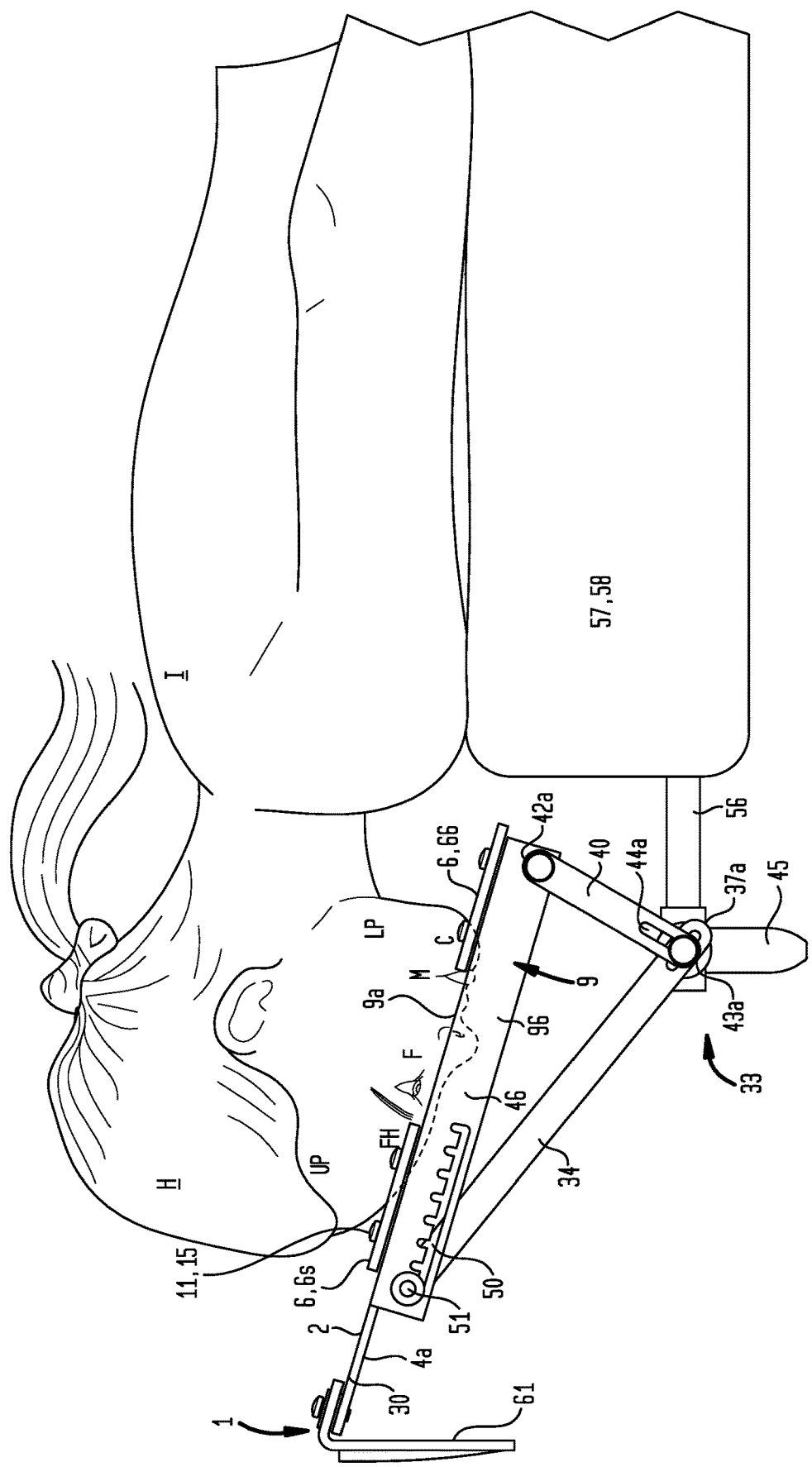
FIG. 1A is an illustration of a method of using a particular embodiment of the inventive face hammock.

Generally, with reference to FIGS. 1A, 1B, 1C and FIGS. 2 through 12, which depict particular embodiments of a face hammock (1) and a method of making and using a face hammock (1) to support the head (H) of an individual (I). Embodiments of the invention can include a first support member (2) and a second support member (3). The first support member (2) can be disposed in opposed spaced apart relation to the second support member (3). Each of the first support member (2) and the second support member (3) have a support member length (SML) disposed between a support member first end (4a, 4b) and a support member second end (5a, 5b). One or more flexible members (6) can be connected to the first support member (2) and connected to the second support member (3) to span a distance (D1) between the first support member (2) and the second support member (3). The first support member (2) disposed in opposed spaced apart relation to the second support member (3) correspondingly connected to a flexible member first end (7) and a flexible member second end (8) at respective positions along the support member length (SL) of the corresponding first support member (2) and the second support member (3) can be adapted to or configured to supportingly engage the head (H) of an individual (I), wherein the upper portion (UP) of the head (H) can include a forehead (FH) of the head (H), and wherein the lower portion (LP) of the head (H) can include a chin (C) of the head (H).

Now, with primary reference to FIGS. 2 through 7 and FIGS. 11 and 12, embodiments of the first support member (2) and the second support member (3) can be provided in various structural forms. As shown in the example of FIGS. 2 through 7, a first angled member (9) and a second angled member (10) each having a first leg (9a, 10a) disposed in generally orthogonal relation to a second leg (9b, 10b) can be disposed in opposed spaced apart relation with the first legs (9a, 10a) inwardly extending to respectively afford an embodiment of the first support member (2) and the second support member (3) as substantially linear plates (2a, 3a) each having a first flat face (2b, 3b) opposite a second flat face (2c, 3c). However, the first support member (2) and the second support member (3) correspondingly configured as the first leg (9a) of a first angled member (9) and the first leg (10a) of a second angled member (10) is not intended to preclude embodiments of the first support member (2) and the second support member (3) having a tubular structure such as cylindrical tubes, triangular tubes, rectangular tubes, or square tubes, or other structures capable of or adapted to having one or more flexible members (6) connected to the first support member (2) and connected to the second support member (3) to span the distance (D1) between the first support member (2) and the second support member (3).

Figure 2:
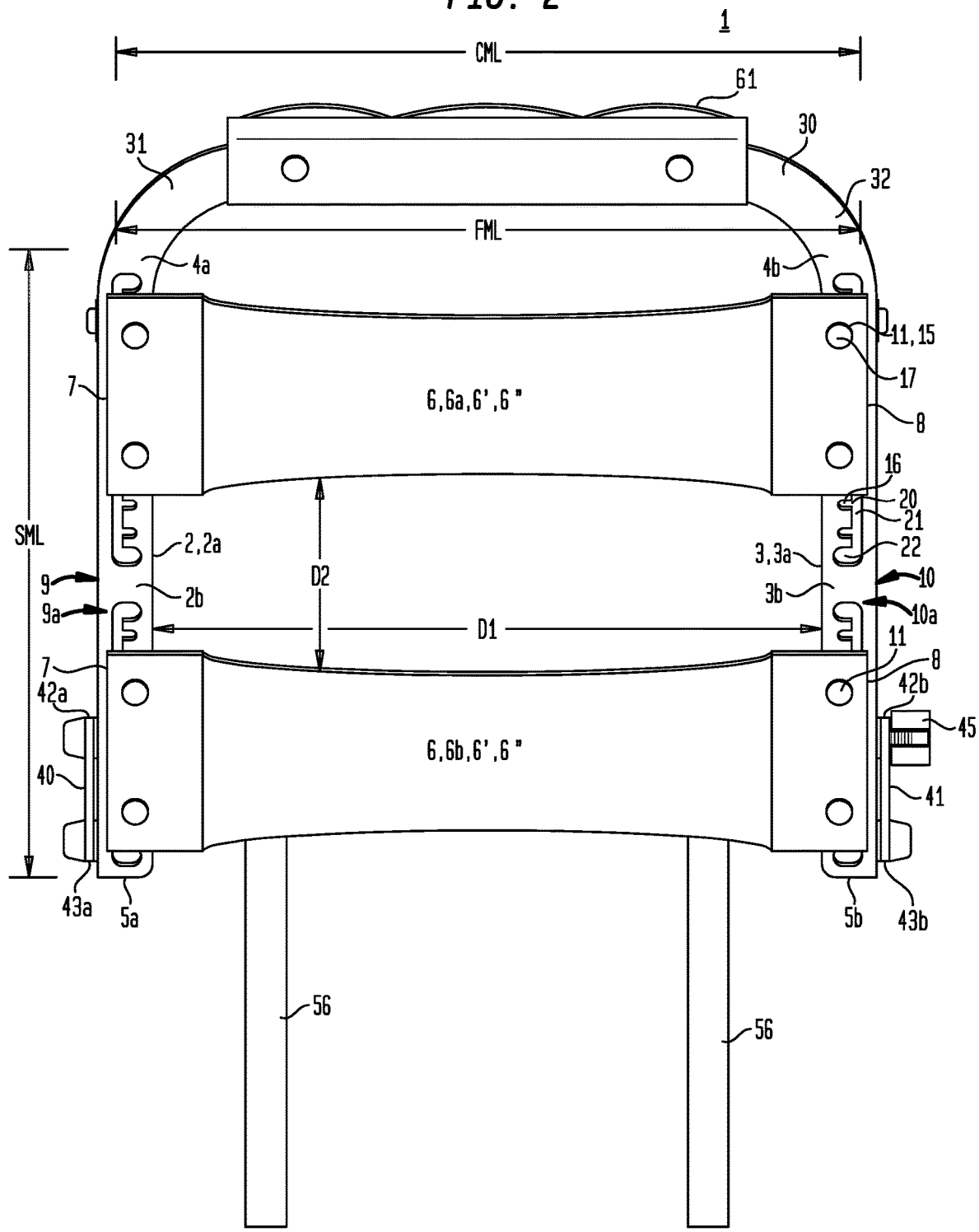
FIG. 2 is a top plan view of the particular embodiment shown in FIG. 1A.
Figure 3:
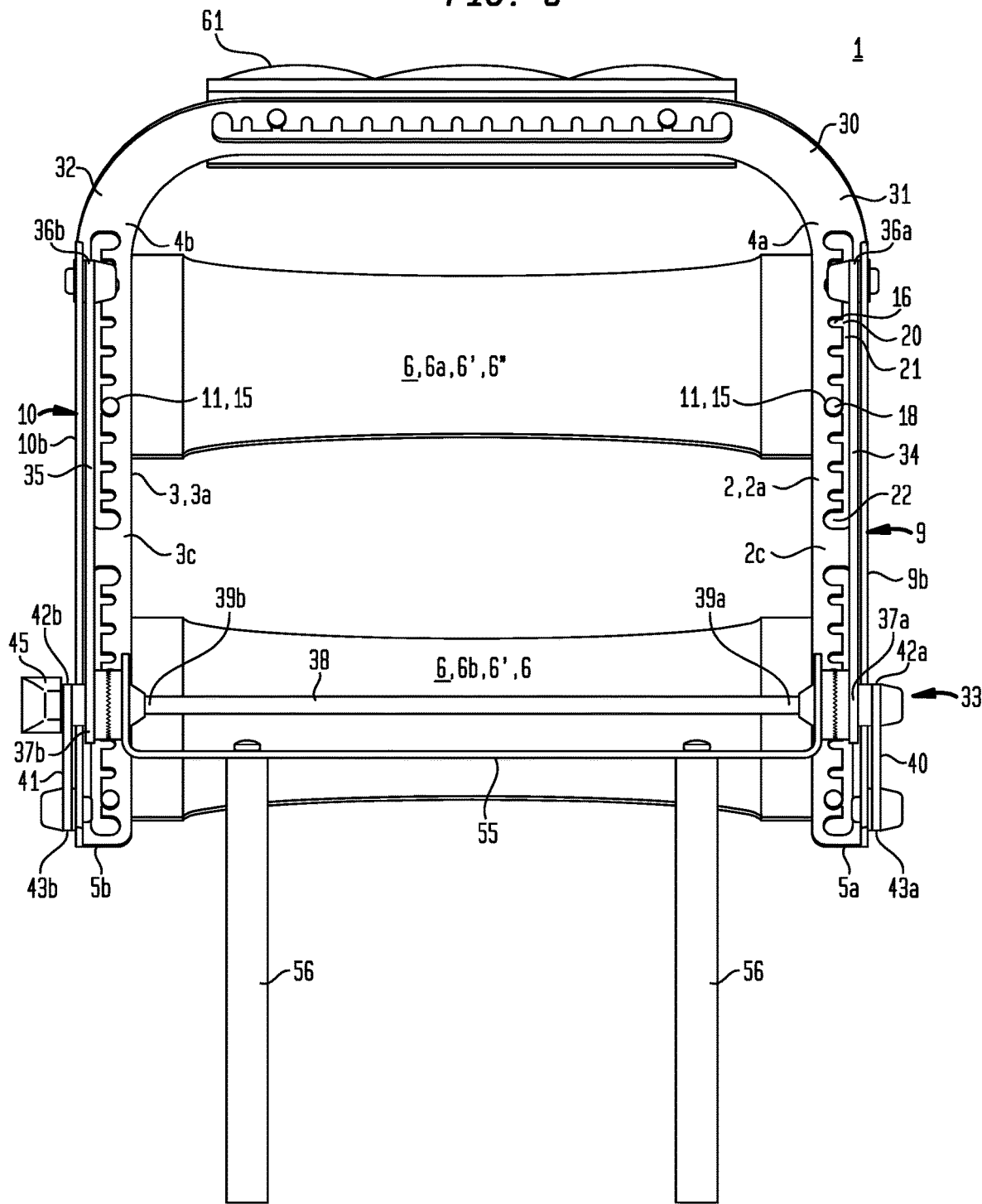
FIG. 3 is bottom plan view of the particular embodiment shown in FIG. 1A.
Figure 4:
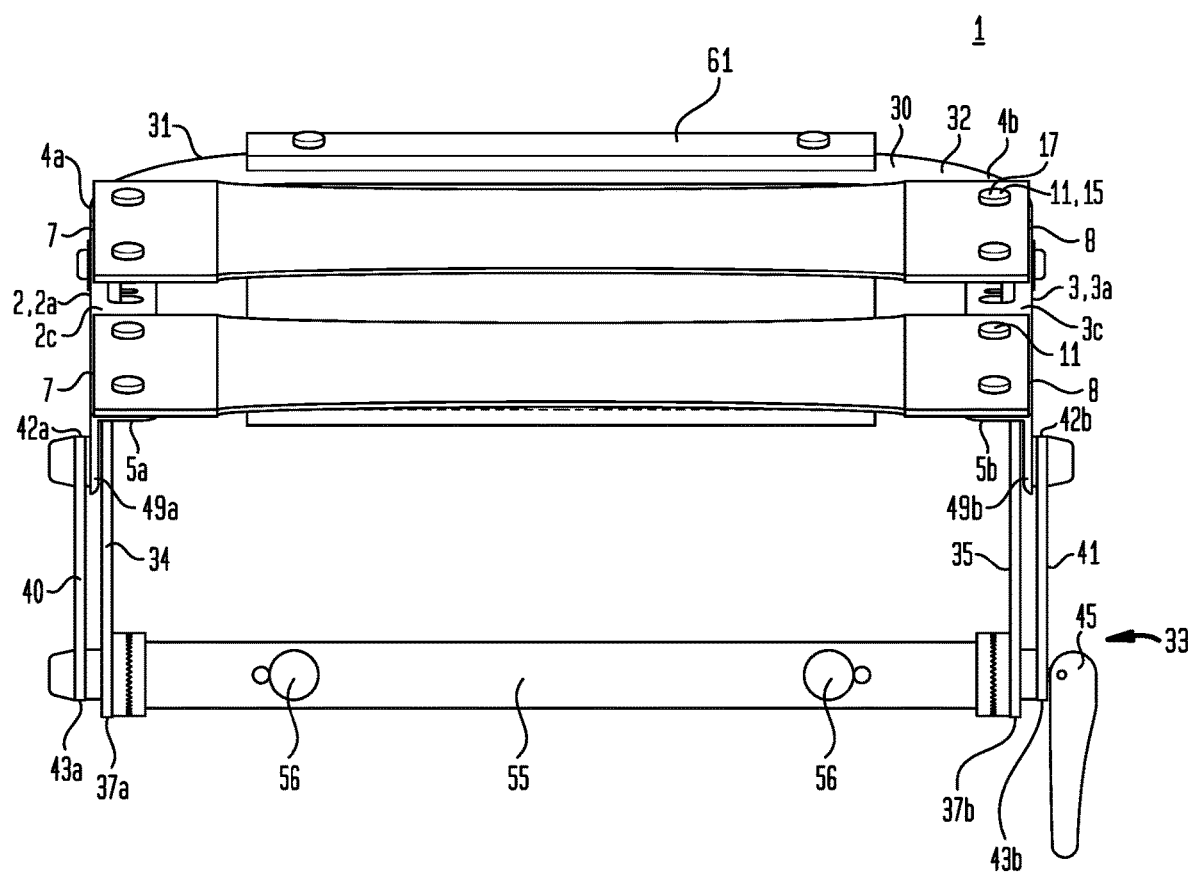
FIG. 4 is a first end view of the particular embodiment shown in FIG. 1A.
Figure 11:
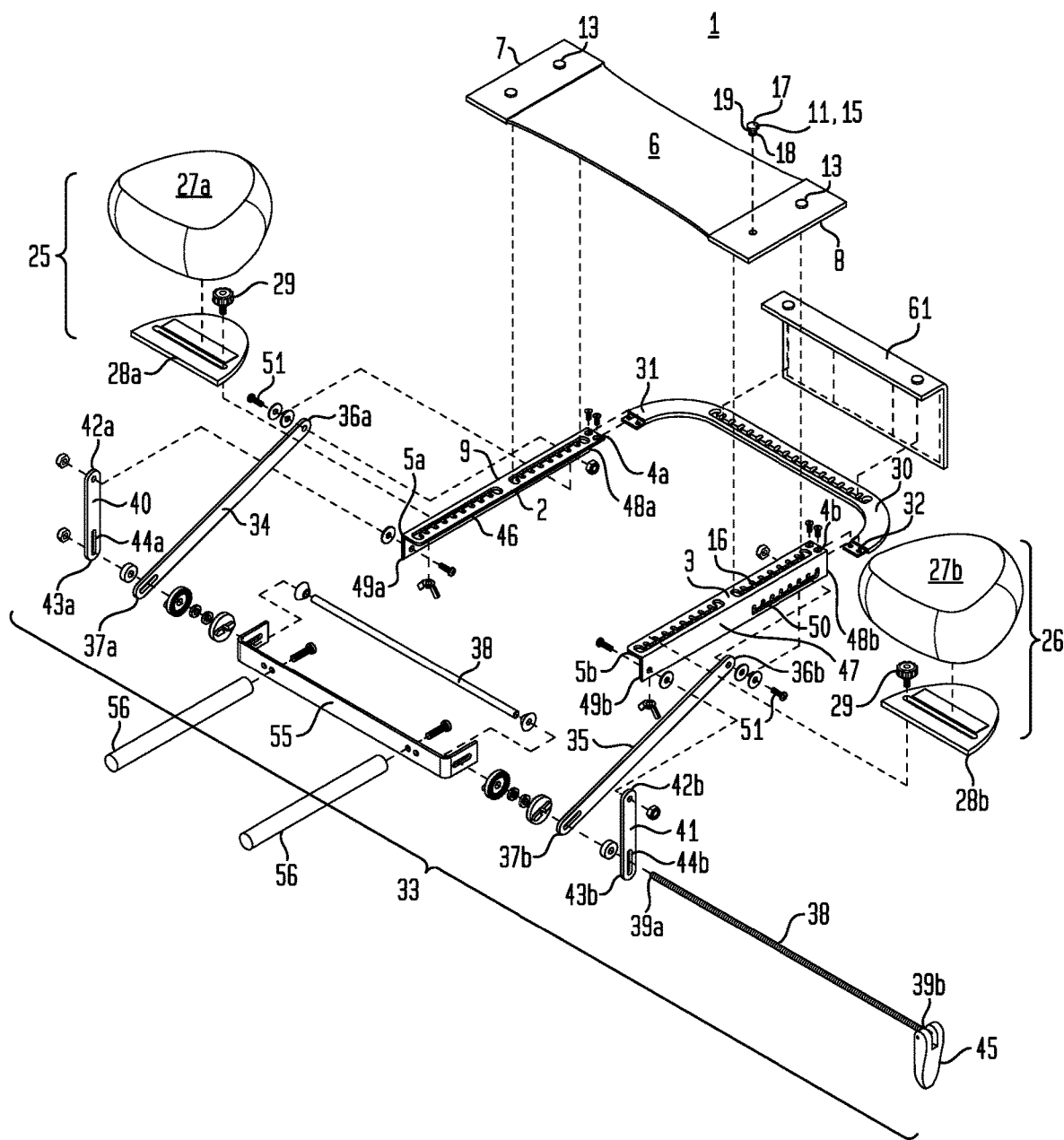
FIG. 11 is an exploded view of a particular embodiment of the inventive face hammock including one or more support pads as shown in FIG. 9 and further illustrating the use of one or more connecting pegs which can be entrained in corresponding peg slots to secure one or more flexible members to the corresponding support members of the inventive face hammock.
Figure 12:
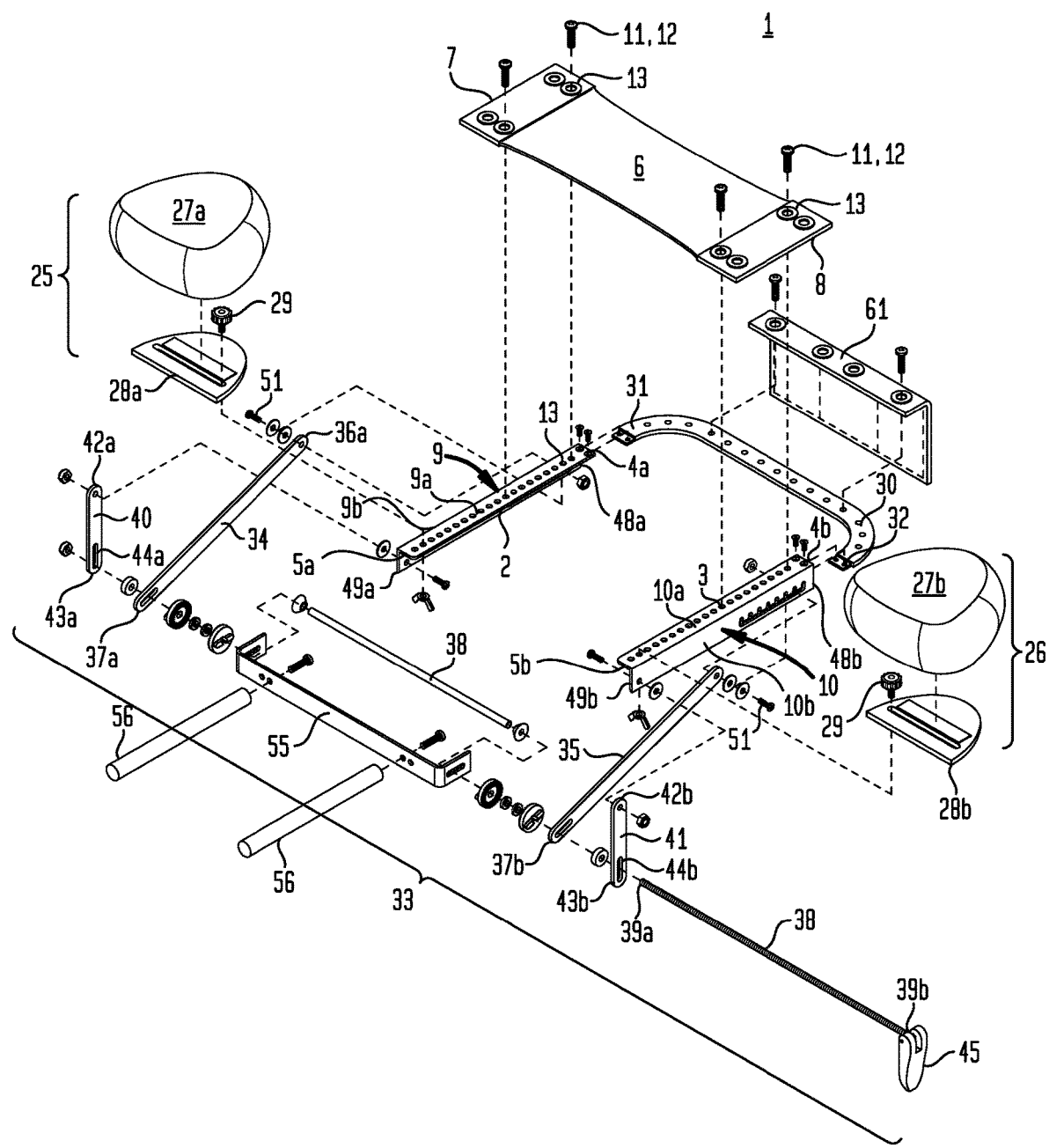
FIG. 12 is an exploded view of a particular embodiment of the inventive face hammock including one or more support pads as shown in FIG. 9 and further illustrating the use of one or more threaded fasteners which can rotatable engaged with corresponding support member threaded apertures to secure one or more flexible members to the corresponding support members of the inventive face hammock.

Now, with primary reference to FIGS. 2 and 11 through 12, in particular embodiments, the one or more flexible members (6) can each having a flexible member length (FML) disposed between a flexible member first end (7) and a flexible member second end (8) and a flexible member width (FMW). Each of the flexible member first ends (7) can be adapted to or configured to connect to the first support member (2) and each of the flexible member second ends (8) can be adapted to or configured to connect to the second support member (3). In particular embodiments, the opposed spaced apart relation of the first and second support members (2, 3) and the flexible member length (FML) of the one or more flexible members (6) can be configured to tension or pull taut the one or more flexible members (6) having the first ends (7) connected to the first support member (2) and having the flexible member second ends (8) connected to the second support member (3). In particular embodiments, the one or more flexible members (6) can be substantially non-resilient flexible members (6') while in other embodiments the one more flexible members (6) can be resilient flexible members (6") which allow the one or more flexible members (6) to stretch in supporting engagement of the head (H) of an individual (I) and return toward the original shape upon disengagement of the head (H) of an individual (I).

Now, with primary reference to FIGS. 11 and 12, embodiments can include flexible member connection parts (11) adapted to or configured to correspondingly releasably connect the first flexible member first end (7) to the first support member (2) and releasably connect the flexible member second end (8) to the second support (3). As shown in the illustrative example of FIG. 11, the flexible member connection parts (11) can, but need not necessarily, comprise one or more threaded connectors (12) correspondingly rotatably threadingly engaged with one or more support member threaded apertures (13) disposed in the first support member (2) or the second support member (3), or both the first support member (2) and the second support member (3). The one or more flexible members (6) can include one or more flexible member apertures (14) disposed proximate each of the flexible member first end (7) and the flexible member second end (8). The one or more threaded connectors (12) can be passed through the one or more flexible member apertures (14) and be threadingly engaged to the corresponding one or more support member threaded apertures (14) in the first or second support member (2, 3) to connect the flexible member first and second ends (7, 8) in substantially fixed spatial relation to the corresponding first support member (2) and the second support member (3).

Now, with primary reference to FIGS. 2 through 7 and 12, in particular embodiments the flexible member connection parts (11) can include one or more connection pegs (15) configured to correspondingly slidingly engage one or more peg slots (16) disposed in the first support member (2) or the second support member (3) or both of the first support member (2) and the second support member (3). In particular embodiments, the connection peg (15) can have a connection peg head (17) or a connection peg foot (18) joined by a connection peg body (19) of lesser dimension than the connection peg head (17) or connection peg foot (18). The connection peg body (19) can be slidingly engaged in a peg slot (16) to engage the connection peg foot (18) with the corresponding first support member (2) or second support member (3) to retain the connection peg (15) in the peg slot (16). The one or more connection pegs (15) can be passed through the one or more flexible member apertures (14) and slidingly engage a corresponding peg slot (16) in the first or second support member (2, 3) to connect the flexible member first and second ends (7, 8) in substantially fixed spatial relation to the corresponding first support member (2) or the second support member (3). In particular embodiments the one or more peg slots (16) can have peg slot first ends (20) interconnected by a connection peg pass-through (21). The connection peg pass-through (21) can have a pass-through open area (22) of sufficient size to allow the peg foot (18) to pass-through and slidingly move the peg body (19) along the peg pass-through (21) to position the connection peg (15) adjacent a peg slot (16). The connection peg (15) can then be slidingly moved into a peg slot (16) to correspondingly connect the flexible member first and second ends (7, 8) to the first and second support member (2,3).

While, these two examples of flexible member connection parts (11) are shown and described, this is not intended to preclude embodiments in which the flexible member connection parts (11) have different structure but are capable of connecting the flexible member first or second ends (7, 8) to the corresponding first support member (2) or second support member (3) and can include, as examples: snap fittings in which interlocking components are slidingly or pressingly interlocked, interference fittings in which components held in mated relation by friction, press fittings in which an oversized peg or tapered peg can be pressed into a slightly small hole, hook and eyelet fittings in which a hook inserts through an eyelet, hook and loop material, and combinations thereof.

Figure 1B:
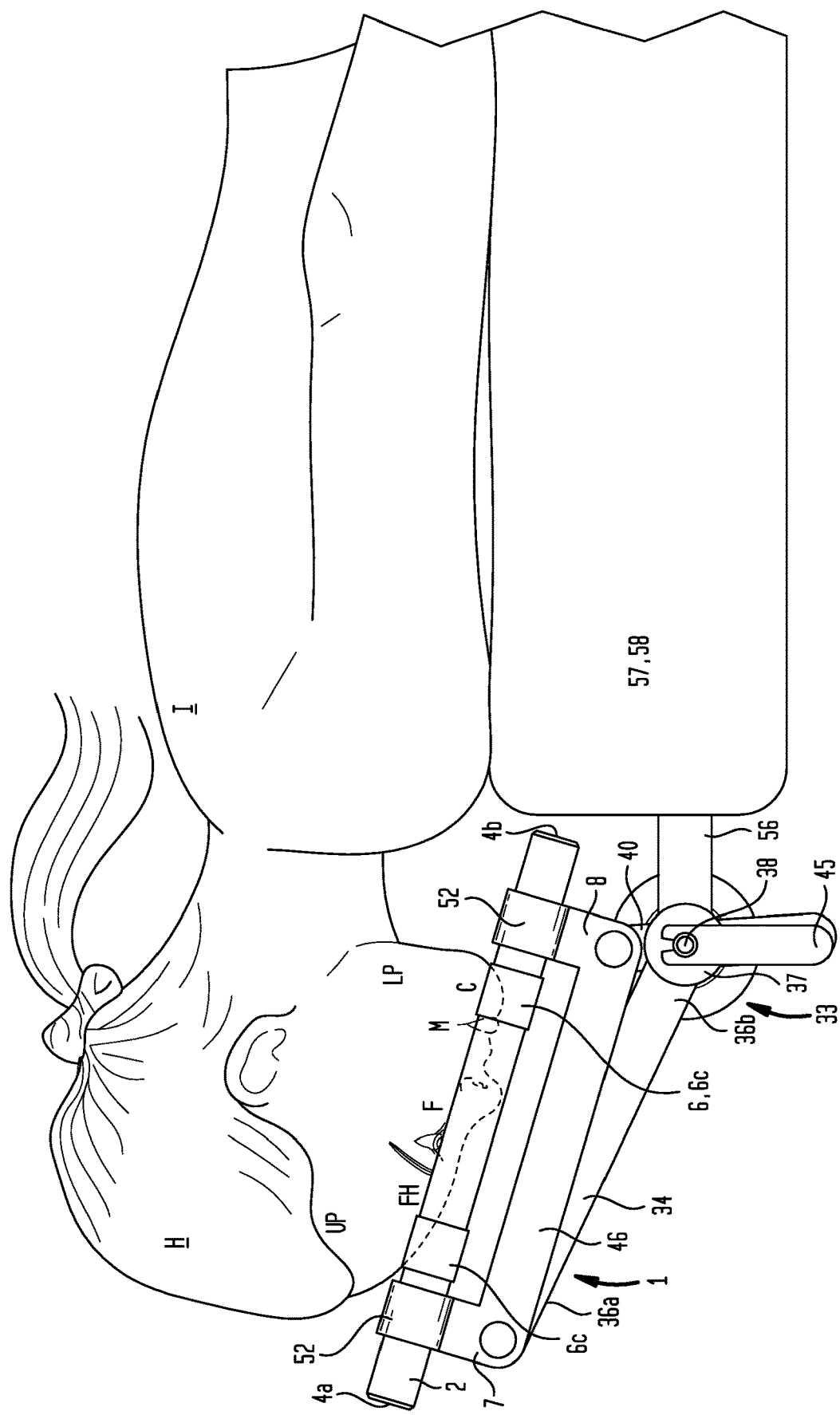
FIG. 1B is an illustration of a method of using another particular embodiment of the inventive face hammock.
Figure 1C:
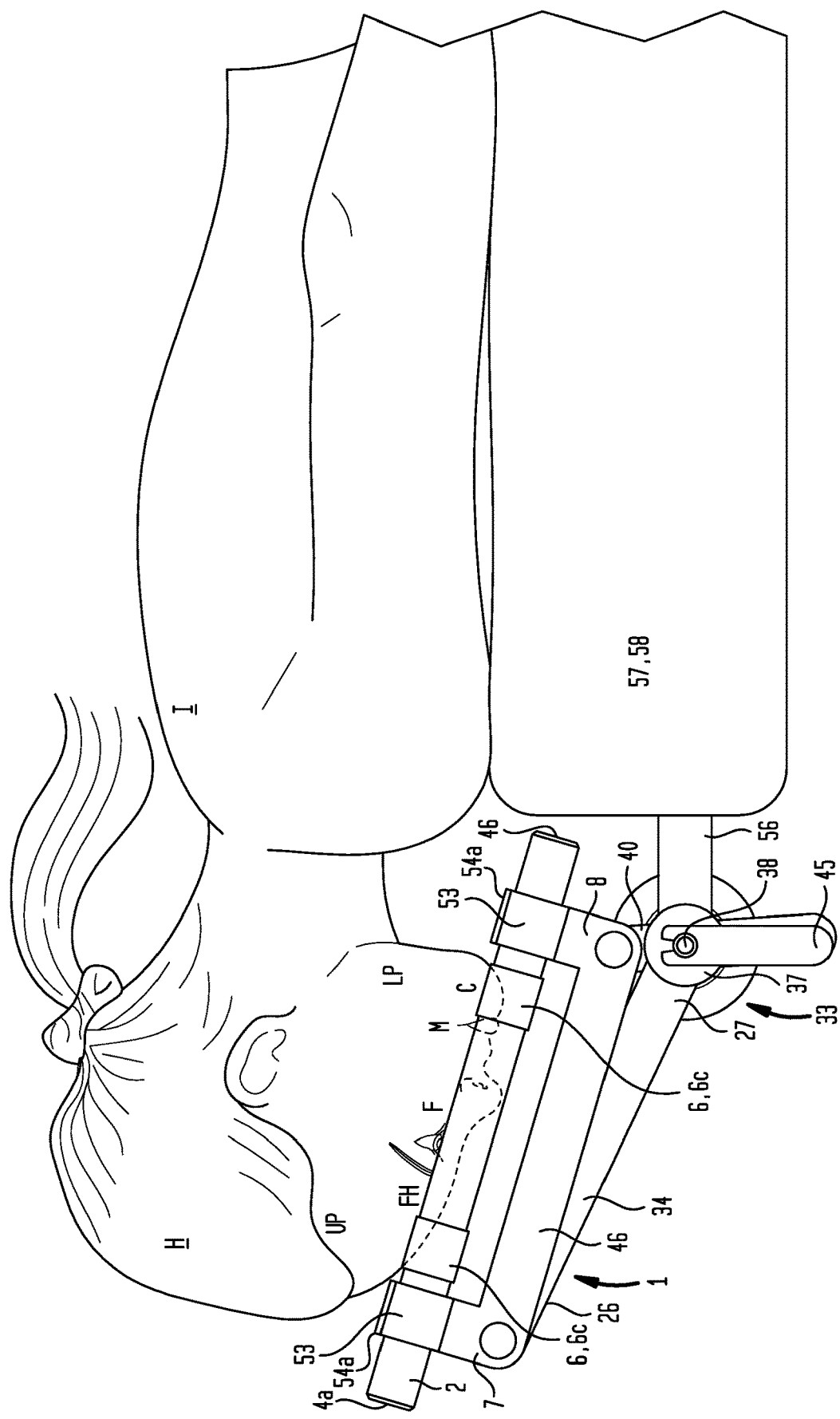
FIG. 1C is an illustration of a method of using another particular embodiment of the inventive face hammock.

Now, with primary reference to FIGS. 1A, 1B, 1C, in particular embodiments, the one or more flexible members (6) can comprise a first flexible member (6a) connected to the first support member (2) and to the second support member (3) at a first position along the support member length (SML) to engage either an upper portion (UP) of the head (H) of an individual (I) or the lower portion (LP) of the head (H) of an individual (I). In an alternative embodiment, the one or more flexible members (6) can comprise a first flexible member (6a) connected to the first support member (2) and the second support member (3) at a first position along the support member length (SML) to engage an upper portion (UP) of the head (H) of an individual (I) and a second flexible member (6b) connected to the first support member (2) and the second support member (3) to support a lower portion (LP) of the head (H) of an individual (I) with the first flexible member (6a) disposed in non-overlapping relation a distance (D2) from the second flexible member (6b).

Now, with primary reference to FIGS. 2 through 7 and 11 through 12, in a further alternative embodiment, the one or more flexible members (6) can comprise a first flexible member (6a) connected to the first support member (2) and the second support member (3) and a second flexible member (6b) connected to the first support member (2) and the second support member (3) with a first flexible member portion (23) of the first flexible member (6a) overlapping a second flexible member portion (24) of the second flexible member (6b) to support an upper portion (UP) of the head (H) of an individual (I) and to support a lower portion (LP) of the head (H) of an individual (I), wherein the overlapping first flexible member portion (23) and second flexible member portion (24) can be drawn apart to afford an open area (OA) between the first and second flexible members (6a) (6b). As an illustrative example, with the individual (I) in the prone position (as shown in the illustrative example of FIG. 1) with the individual's (I) face (F) engaging the face hammock (1), the first flexible member (6a) can engage and support the individual's (I) forehead (FH) and the second flexible (6b) can support the individual's (I) chin (C) and the first flexible member portion (23) and the second flexible member portion (24) can be drawn apart to afford an open area (OA) between the first and second flexible members (6a) (6b) open to the mouth (M) of the individual (I) through which the individual (I) breathes.

Figure 9:
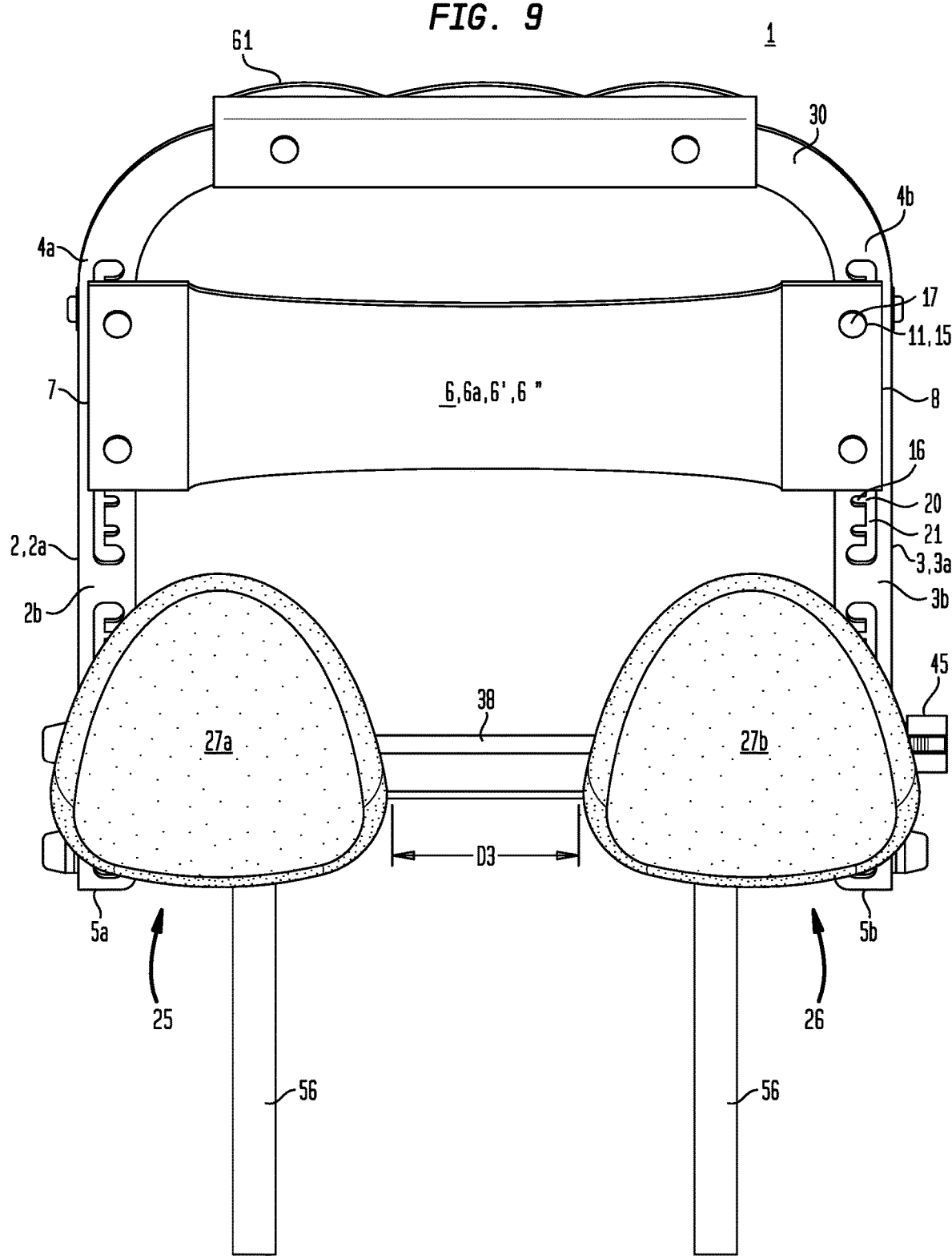
FIG. 9 is a top plan view of another particular embodiment including both a flexible member(s) and one or more support pads.
Figure 10:
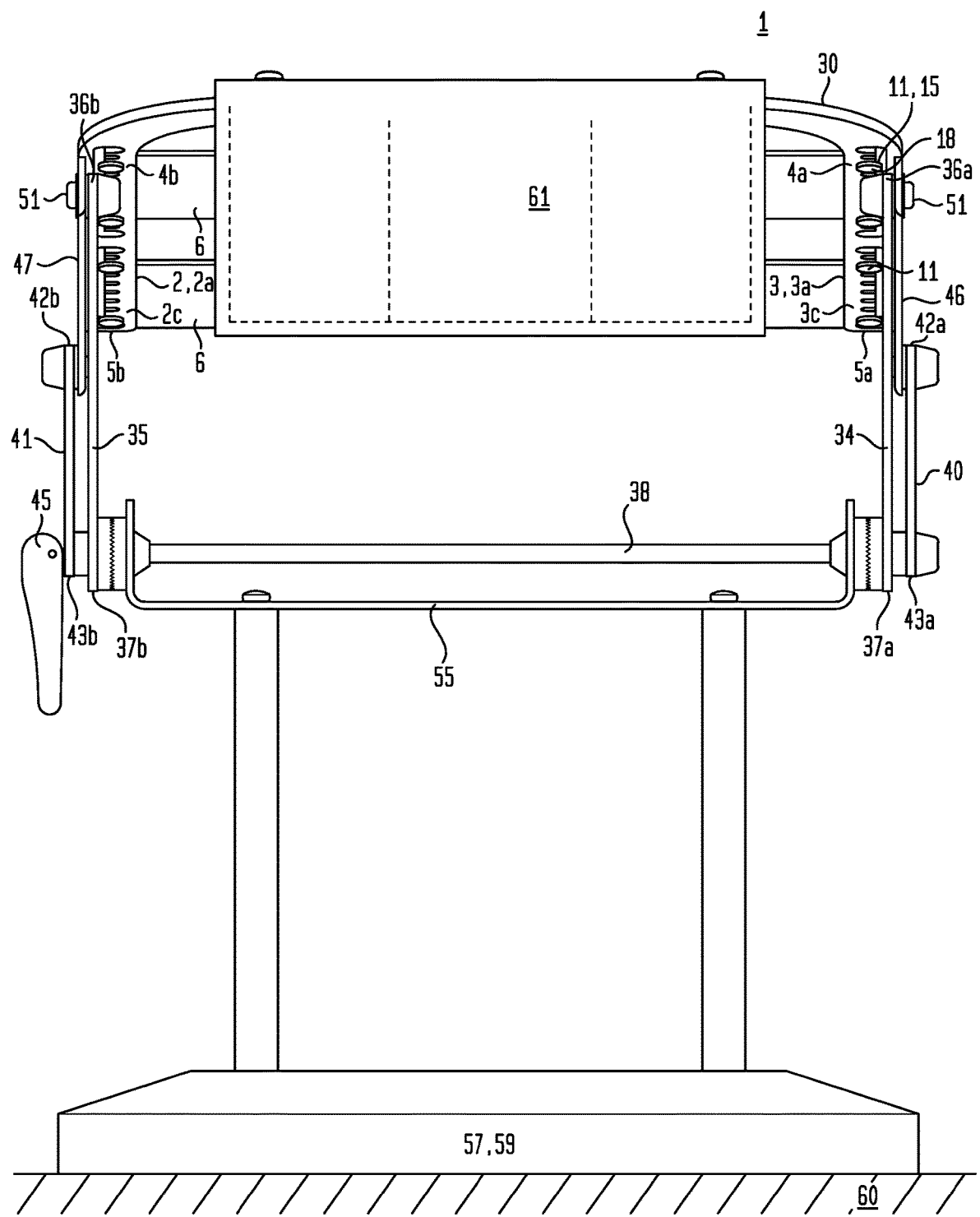
FIG. 10 is front elevation view of another particular embodiment configured to couple to another object to support the inventive face hammock.

Now, with primary reference to FIGS. 9 and 11 through 12, particular embodiments can include a first support pad (25) connected to the first support member (2) proximate the first support member second end (5a). A second support pad (26) can be connected to the second support member (3) proximate the support member second end (5b). In particular embodiments, one or both of the first support pad (25) or the second support pad (26) can be correspondingly rotatably connected to the first support member (2) or said second support member (3). In other particular embodiments, one or both of the first support pad (25) or said second support pad (26) can be slidably connected to the first support member (2) or said second support member (3) to adjust distance (D3) between said first support pad (25) and said second support pad (26). As shown in the illustrative example of FIGS. 11 through 12, the first and second support pad (25, 26) can each include a compliant pad (27) fixedly coupled or releasably coupled to a slotted mount (28a, 28b). The slotted mount (28a, 28b) of the first and second support pad (25, 26) can be correspondingly connected proximate the first and second support member second end (5a, 5b) by passing a mechanical fastener (29) through the respective slotted mount (28a, 28b) and mateably fastened to the first or second support member (2, 3). The first and second support pads (25, 26) can be rotatably or slidingly adjusted to engage the head (H) of an individual (I). In particular embodiments, the first and second support pad (25, 26) can be used discrete from or in combination with one or more flexible members (6), as above described, to support the head (H) of an individual (I).

Now, with primary reference to FIGS. 2 through 7 and 11 through 12, in particular embodiments, a crossmember (30) having a crossmember length (CML) disposed between a crossmember first end (31) and a crossmember second end (32) can be correspondingly connected to the first support member first end (4a) and the second support member first end (4b).

Again, with primary reference to FIGS. 2 through 7 and 11 through 12, embodiments can further comprise a positioning assembly (33), including a first front cantilever arm (34) and a second front cantilever arm (35) each having a front cantilever arm length (FCAL) disposed between a front cantilever arm first end (36a, 36b) and a front cantilever arm second end (37a, 37b). The first and second front cantilever arm first ends (36a, 36b) can be correspondingly pivotally coupled to the first support member (2) and the second support member (3) proximate the first and second support member first ends (4a, 4b) and the first and second front cantilever arm second ends (37a, 37b) correspondingly pivotally coupled proximate opposite pivot rod ends (39a, 39b) of a pivot rod (38). A first rear cantilever arm (40) and a second rear cantilever arm (41) each having a rear cantilever arm length (RCAL) disposed between a rear cantilever arm first end (42a, 42b) and a rear cantilever arm second end (43a, 43b) can have first and second rear cantilever first ends (42a, 42b) correspondingly pivotally coupled to the first support member (2) and the second support member (3) proximate the first and second support member second ends (5a, 5b). The rear cantilever second ends (43a, 43b) can have cantilever second end slots (44a, 44b) to allow opposite pivot rod ends (39a, 39b) of the pivot rod (38) to move within the cantilever second end slots (44a, 44b). A cam lever (45) can be operably coupled to the pivot rod (38) to releasably lock the first and second front cantilever arms (34, 35) and the first and second rear cantilever arms (40, 41) against movement in relation to the pivot rod (38) to correspondingly lock the position of the first and second support members (2, 3).

Now, with primary reference to FIGS. 2 through 7 and 11 through 12, particular embodiments can further include a first pivot rail (46) and a second pivot rail (47) each having a pivot rail length (PRL)(as shown in the illustrative example of FIG. 6) disposed between a pivot rail first end (48a, 48b) and a pivot rail second end (49a, 49b). The first support member (2) and the second support member (3) can be correspondingly coupled in fixed spatial relation or adjustable spatial relation, or releasable relation to the first pivot rail (46) and the second pivot rail (47). As depicted in the illustrative examples, and as above explained, the first angled member (9) and the second angled member (9) can each have a first leg (9a, 10a) disposed in generally orthogonal relation to a second leg (9b, 10b) and disposed in opposed spaced apart relation with the first legs (9a, 10a) inwardly extending to respectively afford an embodiment of the first support member (2) and the second support member (3). The second legs (9b, 10b) can thereby be disposed in opposed spaced apart relation each downwardly extending from the corresponding first leg (9a, 10a) to respectively afford an embodiment of the first pivot rail (46) and the second pivot rail (47). In this particular embodiment, the first support member (2) and the first pivot rail (46) comprise an integrated structure and the second support member (3) and the second pivot rail (47) comprise an integrated structure. In this particular embodiment, the first and second front cantilever arm first ends (42a, 42b) can be correspondingly pivotally coupled to said first pivot rail (46) and the second pivot rail (47) proximate the first and second pivot rail first ends (48a, 48b) and the first and second front cantilever arm second ends (49a, 49b) can be correspondingly pivotally coupled proximate opposite pivot rod ends (39a, 39b) of a pivot rod (38).

Again, with primary reference to FIGS. 2 through 7 and 11, the first and second pivot rails (46, 47) can each have a plurality of pivot rail slots (50) disposed in interconnected spaced apart relation proximate the first and second pivot rail first ends (48a, 48b) and the first and second front cantilever arm first ends (36a. 36b) can each have a front cantilever peg (51) configured to slidingly engage each one the plurality of pivot rail slots (50) to afford positionable rotation of the first and second support members (2, 3) about the first and second rear cantilever arm first ends (42a, 42b).

Now, with primary reference to FIGS. 1B and 1C, in particular embodiments, the first support member (2) and the second support member (3) correspondingly releasably connect to the first pivot rail (46) and the second pivot rail (47). As first illustrative example, each of the first and second pivot rails (46, 47) can correspondingly include a one or more tubular members (52) configured to telescopingly engage the first support member (2) and the second support member (3) to allow axial adjustment in relation to or removal from the first pivot rail (46) and the second pivot rail (47)(as shown in the example of FIG. 1B). In a second illustrative example, each of the first pivot rail (46) and the second pivot rail (47) can include one or more spring clips (53) each having opposing retainer arms (54a, 54b) configured to receive and resiliently retain the corresponding one of the first support member (2) and the second support member (3) (as shown in the example of FIG. 1C). The opposing retainer arms (54a, 54b) deflecting outward and increasing in width when inserting or removing the first support member (2) or second support member (3) between the opposing retainer arms (54a, 54b). As to these embodiments, the one or more flexible members (6) can comprise one or more resilient circuitous bands (6c) disposed around the first and second support members (2)(3).

Figure 5:
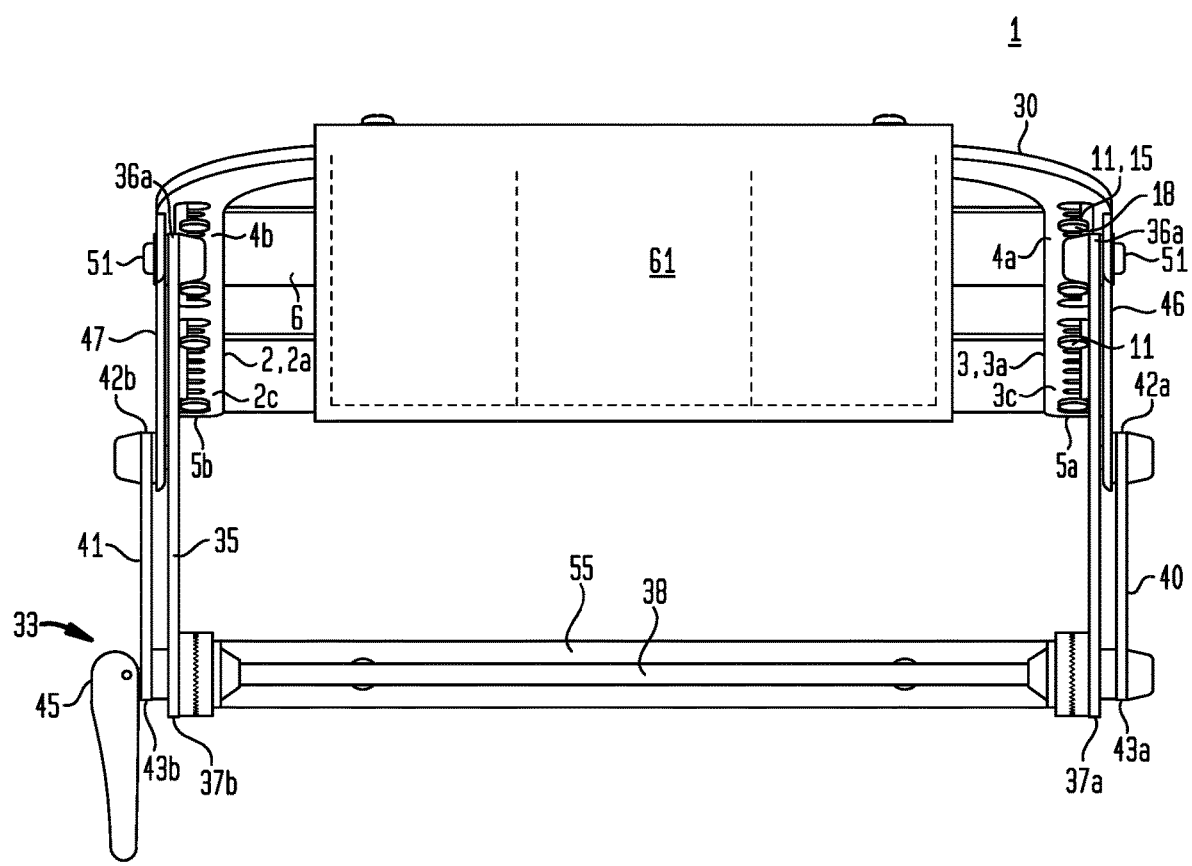
FIG. 5 is a second end view of the particular embodiment shown in FIG. 1A.
Figure 6:
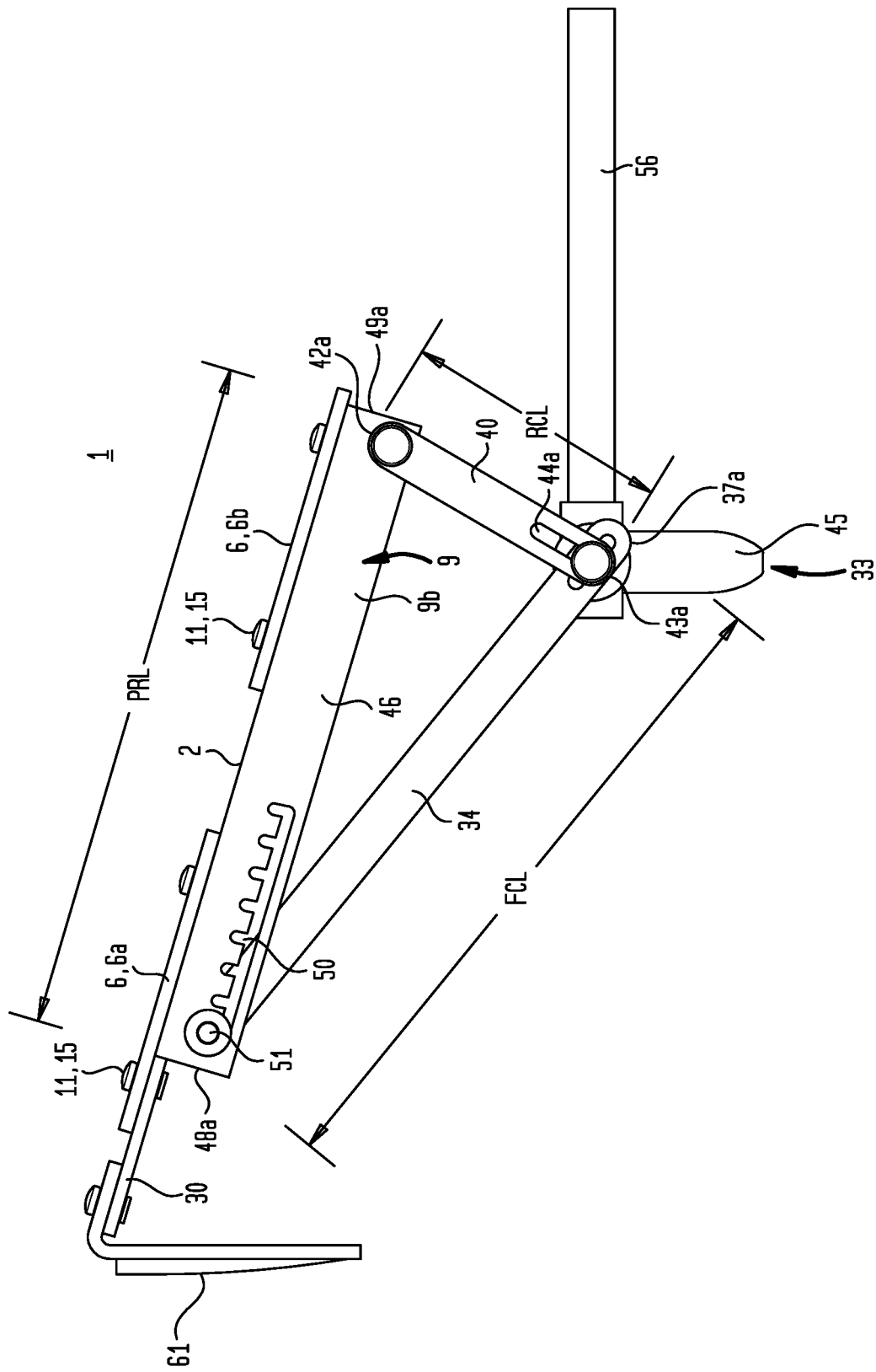
FIG. 6 is a first side view of the particular embodiment shown in FIG. 1A.
Figure 7:
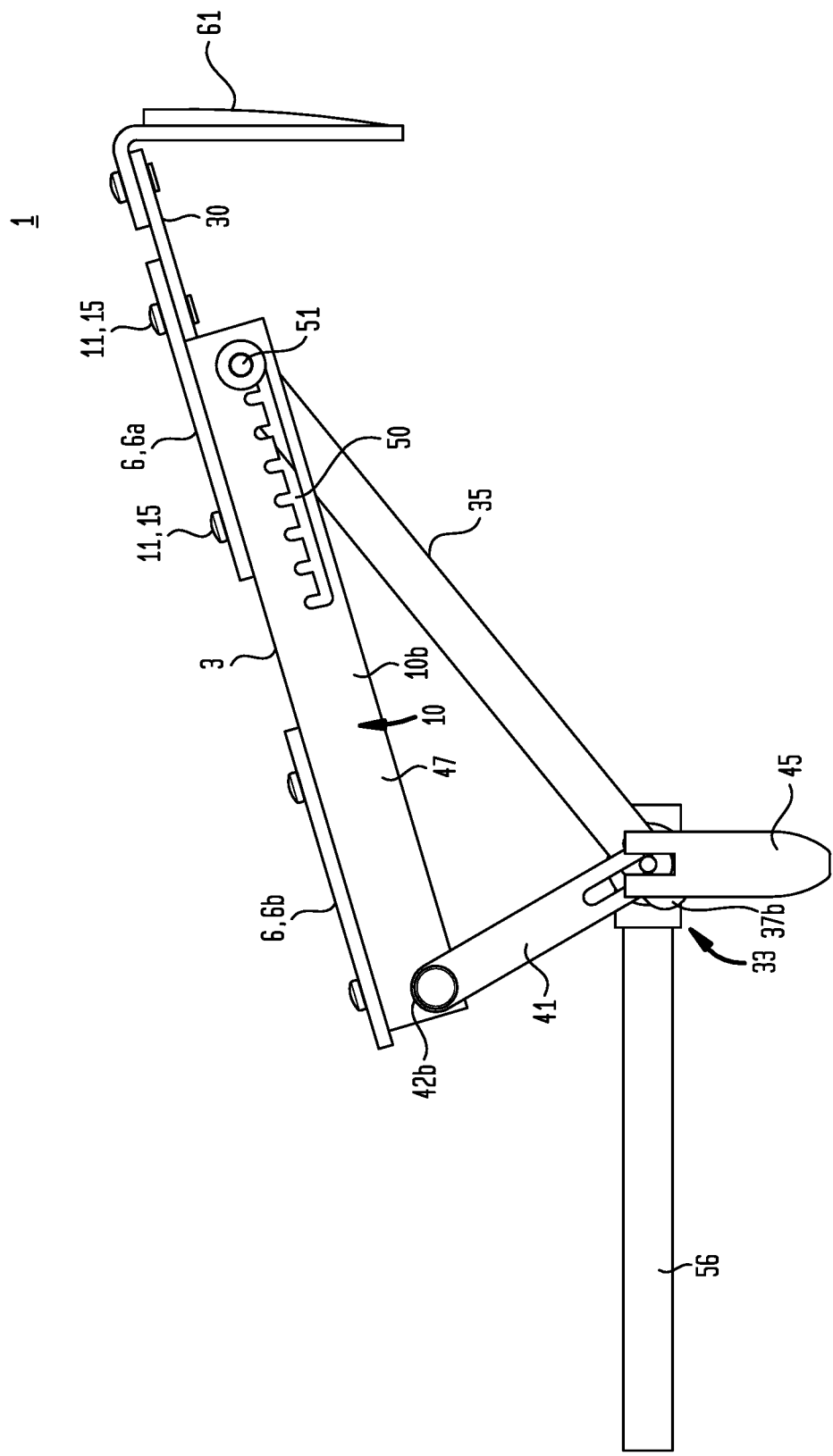
FIG. 7 is a second side view of the particular embodiment shown in FIG. 1A.
Figure 8:
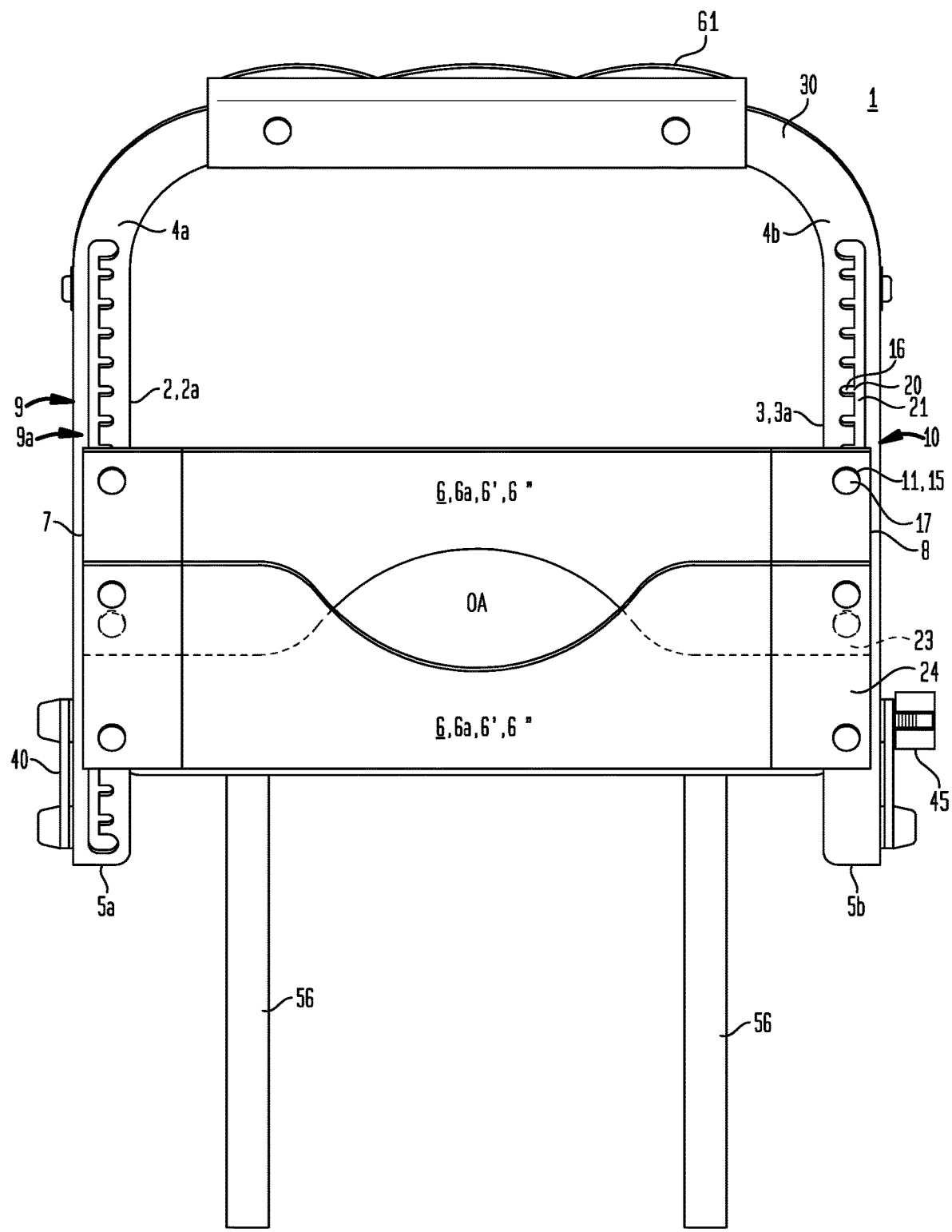
FIG. 8 is a top plan view illustrating a first portion of first flexible member overlapping a first portion of a second flexible member with overlapping portions drawn apart to provide an opening in the overlapping portions.

Now, with primary reference to FIGS. 5 and 6, particular embodiments can further include a pocket or compartmentalized pocket (61) connected to the crossmember (30). The pocket (61) can include a single interior space or the pocket (61) can have the interior space divided into a plurality of compartments configured to hold various items including as examples: tissues, hand sanitizer, face mask, cell phone, tablet computer, eye glasses, jewelry or the like. This provides the advantage of having these items at a location available to the hands of the individual (I).

Now, with primary reference to FIGS. 1A, 1B, 1C and 10, in particular embodiments, a mounting bracket (55) can be coupled to opposite pivot rod ends (39a, 39b) of the pivot rod (38). The mounting bracket (55) can be joined to various configurations of face hammock mounts (56) to allow the face hammock (1) to be coupled to other objects (57). In the illustrative example of FIGS. 1A and 1B, the configuration of the face hammock mount (56) can include pair of mounting arms (56a, 56b) adapted to or configured to mount the face hammock (1) to a massage table (58). In the illustrative example of FIG. 10, the pair mounting arms (56a, 56b) can be joined to a stand (59) adapted to or configured to support the face hammock (1) at a heigh above a support surface (60). While the Figures depict a pair of mounting arms (56a, 56b), embodiments can include one or more mounting arms (56a, 56b, 56c, 56d . . . ) adapted to or configured to support the face hammock (1) above a support surface (60) or adapted to join the face hammock (1) to another object (57).

As can be easily understood from the foregoing, the basic concepts of the present invention may be embodied in a variety of ways. The invention involves numerous and varied embodiments of a face hammock and methods for making and using such face hammock.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "connector" should be understood to encompass disclosure of the act of "connecting"—whether explicitly discussed or not—and, conversely, were there is a disclosure of the act of "connecting", such a disclosure should be understood to encompass disclosure of a "connector" and even a "means for connecting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the face hammocks herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An apparatus, comprising:
   a first support member and a second support member, each having a support member length disposed between a support member first end and a support member second end, said first support member disposed in opposed spaced apart relation to said second support member;
   a plurality of flexible members each having a flexible member length disposed between a flexible member first end and a flexible member second end,
      wherein each of said flexible member first ends include a plurality of connectors which directly detachably connect to said first support member and each of said flexible member second ends include a plurality of connectors which directly detachably connect to said second support member,
      wherein said flexible member first ends and said flexible member second ends directly detachably connect along said length of said first support member and said second support member at respective positions along said support member length to position said plurality of flexible members in fixed spatial relation to supportingly engage an individual's head.

2. The apparatus of claim 1, wherein said plurality of flexible members comprise a first flexible member connected to said first support member and to said second support member at a position along said support member length to engage either an upper portion of said individual's head or a lower portion of said individual's head.

3. The apparatus of claim 2, wherein said plurality of flexible members comprise said first flexible member connected to said first support member and said second support member at a position along said support member length to engage said upper portion of said individual's head and a second flexible member connected to said first support member and said second support member to support said lower portion of said individual's head, said first flexible member disposed a distance from said second flexible member.

4. The apparatus of claim 2, wherein said upper portion of said individual's head comprises a forehead of said individual's head and wherein said lower portion of said individual's head comprises a chin of said individual's head.

5. The apparatus of claim 1, further comprising a first support pad connected to said first support member proximate said first support member second end.

6. The apparatus of claim 5, further comprising a second support pad connected to said second support member proximate said support support member second end.

7. The apparatus of claim 5, wherein one or both of said first support pad or said second support pad rotatably connected to first support member or said second support member.

8. The apparatus of claim 7, wherein one or both of said first support pad or said second support pad slidably connected to said first support member or said second support member to adjust distance between said first support pad and said second support pad.

9. The apparatus of claim 1, further comprising a cross member having a length disposed between a cross member first end and a cross member second end correspondingly connected to said first support member first end and said second support member first end.

10. An apparatus, comprising:
a first support member and a second support member, each having a support member length disposed between a support member first end and a support member second end, said first support member disposed in opposed spaced apart relation to said second support member;
a plurality of flexible members each having a flexible member length disposed between a flexible member first end and a flexible member second end,
wherein each of said flexible member first ends includes a plurality of connectors which directly detachably connect to said first support member and each of said flexible member second ends directly detachably connect to said second support member,
wherein said flexible member first ends and said flexible member second ends directly detachably connect along said length of said first support member and said second support member to position said plurality of flexible members in fixed spatial relation to supportingly engage an individual's head,
wherein said plurality of connectors which directly detachably connect to said first support member and said plurality of connectors which directly detachably connect to said second support member are adapted to adjust said flexible member length of said plurality of flexible members to adjust tension in one or more of said plurality of flexible members having said first ends connected to said first support member and having said second ends connected to said second support member.

11. The apparatus of claim 10, wherein said plurality of connectors releasably connectable to said first support member and said plurality of connectors releasably connectable to said second support member comprise grommets through which threaded connectors pass and correspondingly rotatably threadingly engaged with threads disposed in said first support member or said second support member.

12. The apparatus of claim 10, wherein said plurality of connectors comprise a plurality of connection pegs attached to said flexible member first ends to directly detachably connect along said length of said first support member and a plurality of connection pegs attached to said flexible member second ends to directly detachably connect along said length of said second support member, said plurality of pegs configured to correspondingly slidingly engage one or more peg slots disposed in said first support member or said second support member.

13. The apparatus of claim 12, wherein said first support member and said second support member having flat linear structure along said support member length.

14. An apparatus, comprising:
a first support member and a second support member, each having a support member length disposed between a support member first end and a support member second end, said first support member disposed in opposed spaced apart relation to said second support member;
a plurality of flexible members each having a flexible member length disposed between a flexible member first end and a flexible member second end,
wherein each of said flexible member first ends directly detachably connect to said first support member and each of said flexible member second ends directly detachably connect to said second support member,
wherein said flexible member first ends and said flexible member second ends directly detachably connect along said length of said first support member and said second support member to position said plurality of flexible members in fixed spatial relation to supportingly engage an individual's head; and
a mounting bracket coupled to said second end of said first support member and said second end of said second support member, said mounting bracket having at least one mounting arm outwardly extending from said mounting bracket.

15. The apparatus of claim 14, further comprising a massage table, said at least one mounting arm adapted to mount said apparatus to said massage table.

* * * * *